(12) United States Patent
Kuo et al.

(10) Patent No.: US 8,155,830 B2
(45) Date of Patent: Apr. 10, 2012

(54) PARKING PILOT SYSTEM AND METHOD

(75) Inventors: Yung-Yuan Kuo, Lugang (TW); Hsin-Pin Yu, Lugang (TW)

(73) Assignee: Automotive Research & Test Center, Changhua County (TW)

( * ) Notice: Subject to any disclaimer, the term of this patent is extended or adjusted under 35 U.S.C. 154(b) by 708 days.

(21) Appl. No.: 12/329,798

(22) Filed: Dec. 8, 2008

(65) Prior Publication Data
US 2010/0100270 A1    Apr. 22, 2010

(30) Foreign Application Priority Data
Oct. 21, 2008   (TW) ............................... 97140266 A

(51) Int. Cl.
*G06F 7/00* (2006.01)
(52) U.S. Cl. .................. 701/36; 340/932.2; 340/435
(58) Field of Classification Search .............. 701/932.2, 701/36; 340/932.2, 435
See application file for complete search history.

(56) References Cited

U.S. PATENT DOCUMENTS

| | | | |
|---|---|---|---|
| 7,825,828 B2 * | 11/2010 | Watanabe et al. | 340/932.2 |
| 2005/0049766 A1 * | 3/2005 | Tanaka et al. | 701/36 |
| 2006/0087414 A1 * | 4/2006 | Simonazzi | 340/435 |
| 2006/0287825 A1 * | 12/2006 | Shimizu et al. | 701/216 |
| 2008/0158011 A1 * | 7/2008 | Yamanaka | 340/932.2 |
| 2009/0251334 A1 * | 10/2009 | Yoshihashi et al. | 340/932.2 |

* cited by examiner

*Primary Examiner* — Khoi Tran
*Assistant Examiner* — Kira Nguyen
(74) *Attorney, Agent, or Firm* — Ming Chow; Sinorica, LLC

(57) ABSTRACT

The present invention discloses a parking pilot system and method. The system of the present invention comprises a display, at least one image sensor, at least one speed sensor and an ECU. The ECU uses the images captured by the image sensor to calculate an intended parking position and uses the captured images and the detected speed to work out the coordinates of the current position and the intended parking position. The ECU also works out an initial parking position. According to the adopted parking mode, the ECU presents on the display a forward pilot track extending from the current position through the initial parking position to the intended parking position, or a forward pilot track extending from the current position to the initial parking position. Then, the driver can easily park his vehicle and effectively avoid collision via the pilot instructions presented on the display.

20 Claims, 13 Drawing Sheets

(a)

(b)

(a)

(b)

PARKING PILOT SYSTEM AND METHOD

BACKGROUND OF THE INVENTION

1. Field of the Invention

The present invention relates to a parking pilot system, particularly to a parking pilot system and method, which can evaluate the environment and provide the driver with a pilot track to park in an intended position.

2. Description of the Related Art

During traffic-busy hours, a driver usually has to drive around and around to find a parking bay in a heavily crowded area. Sometimes, the driver finds none parking bay eventually. Sometimes, the driver has seen a parking bay, but he passes by and misses it with no chance to return to the parking bay. Sometimes, the driver has found a parking bay, but the inexperienced driver has to move his vehicle to and fro to see whether the parking bay can accommodate his vehicle; if the answer is no, he can only go away to find another parking bay. Those laborious and time-consuming parking activities repeat everywhere every day, which are likely to jam traffic or even cause traffic accidents. Moreover, if the driver is inexperienced or unskillful, the parking process may damage another vehicle or object, which is likely to cause a quarrel. Therefore, devising a method for easily parking is a worthy subject.

At present, the fundamental parking pilot system uses the frequencies of buzzing, which is generated by a distance sensor and an audio alert system, to indicate the driver of the distance between the barrier and the vehicle when the driver is reversing his vehicle. A better parking pilot system further uses a camera and a monitor to provide images for the driver when the driver is reversing his vehicle. However, an inexperienced driver is still hard to determine whether the parking area is sufficient to park his vehicle according to the above-mentioned information. Further, limited by the detection range of the distance sensor, an unskillful driver is still hard to park his vehicle into an intended area or even causes a collision with an adjacent barrier.

There are some prior arts proposing auxiliary parking devices, which all use a rear camera to capture the images behind the vehicle to help the driver reverse his vehicle into a parking area, including Taiwan patents No. I265882, No. I230128, No. I229645, No. 533154, No. 518292, and No. 200706418. The abovementioned prior art can assist a driver in reversing his vehicle. However, the assistance will not start unless the driver has moved his vehicle to an initial position meeting the requirement of the auxiliary parking system. Thus, the driver has to move his vehicle to and fro to an initial position, which considerably reduces the value of the auxiliary parking systems. Therefore is desired a parking pilot system and method, which can determine the initial position for parking and then pilot a vehicle to park.

Accordingly, the present invention proposes a fast and precise parking pilot system and method, which can automatically evaluate whether a parking position is appropriate and pilot a driver to park well, whereby the driver neither relies on his experience to park nor wastes his time on incorrect estimations.

SUMMARY OF THE INVENTION

One objective of the present invention is to provide a parking pilot system and method, which provides a clear forward or backward pilot track for a driver, whereby the driver can directly park his vehicle into a intended parking position or drives his vehicle to an initial parking position for parking his vehicle.

Another objective of the present invention is to provide a parking pilot system and method, which supports several parking modes and proposes an optimized parking mode to the driver according to the intended parking position.

Yet another objective of the present invention is to provide a parking pilot system and method, wherein a position select frame enables the driver to select an intended parking position when there is no clearly-marked parking bay beside the street, and then the position select frame remains on the display and stays in the intended parking position.

A further objective of the present invention is to provide a parking pilot system and method, which supports several parking modes and provides appropriate pilot tracks to meet various parking environments, and which instructs the driver to drive forward to a initial parking position for parking his vehicle or drive forward/backward into the intended parking position directly.

To achieve the abovementioned objectives, the present invention proposes a parking pilot system and a parking pilot method. The parking pilot system of the present invention comprises a display arranged inside a vehicle and presenting images to a driver; at least one image sensor arranged on the surface the vehicle body and capturing images ahead of the vehicle; at least one speed sensor detecting the speed of the vehicle; and an electronic control unit collecting information and sending out parking instructions. The electronic control unit defines an intended parking position according to the images captured by the image sensor. The electronic control unit calculates the coordinates of the current position and the intended parking position according to the captured images and the detected speed. Then, the electronic control unit works out an initial parking position. According to the adopted parking mode, the electronic control unit presents on the display a forward pilot track extending from the current position through the initial parking position to the intended parking position, or a forward pilot track extending from the current position to the initial parking position. The present invention provides the driver with an available parking track, whereby a driver can easily and efficiently park his vehicle, and whereby an inexperienced or unskillful driver needn't worry about a narrow parking space or a collision with a barrier.

Below, the embodiments are described in detail in cooperation with the attached drawings to make easily understood the objectives, technical contents, characteristics and accomplishments of the present invention.

BRIEF DESCRIPTION OF THE DRAWINGS

FIG. 5 is a diagram schematically showing the pictures presented on the display and instructing the driver to park in the head-in parking mode shown in FIG. 4, wherein FIG. 5(a) shows that an intended parking position is defined, and FIG. 5(b) shows that a pilot track guides the driver to park.

FIG. 8 is a diagram schematically showing the pictures presented on the display and instructing the driver to park in the head-in parking mode shown in FIG. 6, wherein FIG. 8(a) shows that an intended parking position is defined;

FIG. 8(b) shows a pilot track extending from a current position to an initial parking position;

FIG. 8(c) shows a driving track of backing a vehicle and a pilot track for parking the vehicle; and FIG. 8(d) shows the vehicle is about parallel to the intended parking position.

FIG. 11 is a diagram schematically showing the pictures presented on the display and instructing the driver to park in the tail-in parking mode shown in FIG. 9, wherein FIG. 11(a) shows a pilot track extending form an intended parking position to an initial parking position, and FIG. 11(b) shows that a pilot track guides the driver to back the vehicle;

FIG. 13 is a diagram schematically showing the pictures presented on the display and instructing the driver to park in the on-street parking mode shown in FIG. 12, wherein FIG. 13(a) shows that an intended parking position is defined;

FIG. 13(b) shows a pilot track extending from a current position to an initial parking position; and FIG. 13(c) shows a driving track of backing a vehicle and a pilot track for backing the vehicle.

DETAILED DESCRIPTION OF THE INVENTION

The present invention proposes a parking pilot system and method, which provides a fast and precise parking pilot process. Firstly, ECU (Electronic Control Unit) uses a position select frame to define an appropriate intended parking position automatically, or the user manually moves the position select frame to an intended parking position on a touchscreen. Based on the intended parking position and the minimum turning radius of a vehicle, the system works out an initial parking position and plans a forward pilot track extending from the current position of the vehicle to the initial parking position. After the vehicle has reached the initial parking position, the system proceeds to plan a parking pilot track extending from the initial parking position to the intended parking position. Then, the system pilots the driver to park the vehicle into the intended parking position smooth and easily. The position select frame will remain on the screen until the vehicle has been parked in the intended parking position. Furthermore, said parking pilot track is a forward or a backward pilot track.

Figure 1:
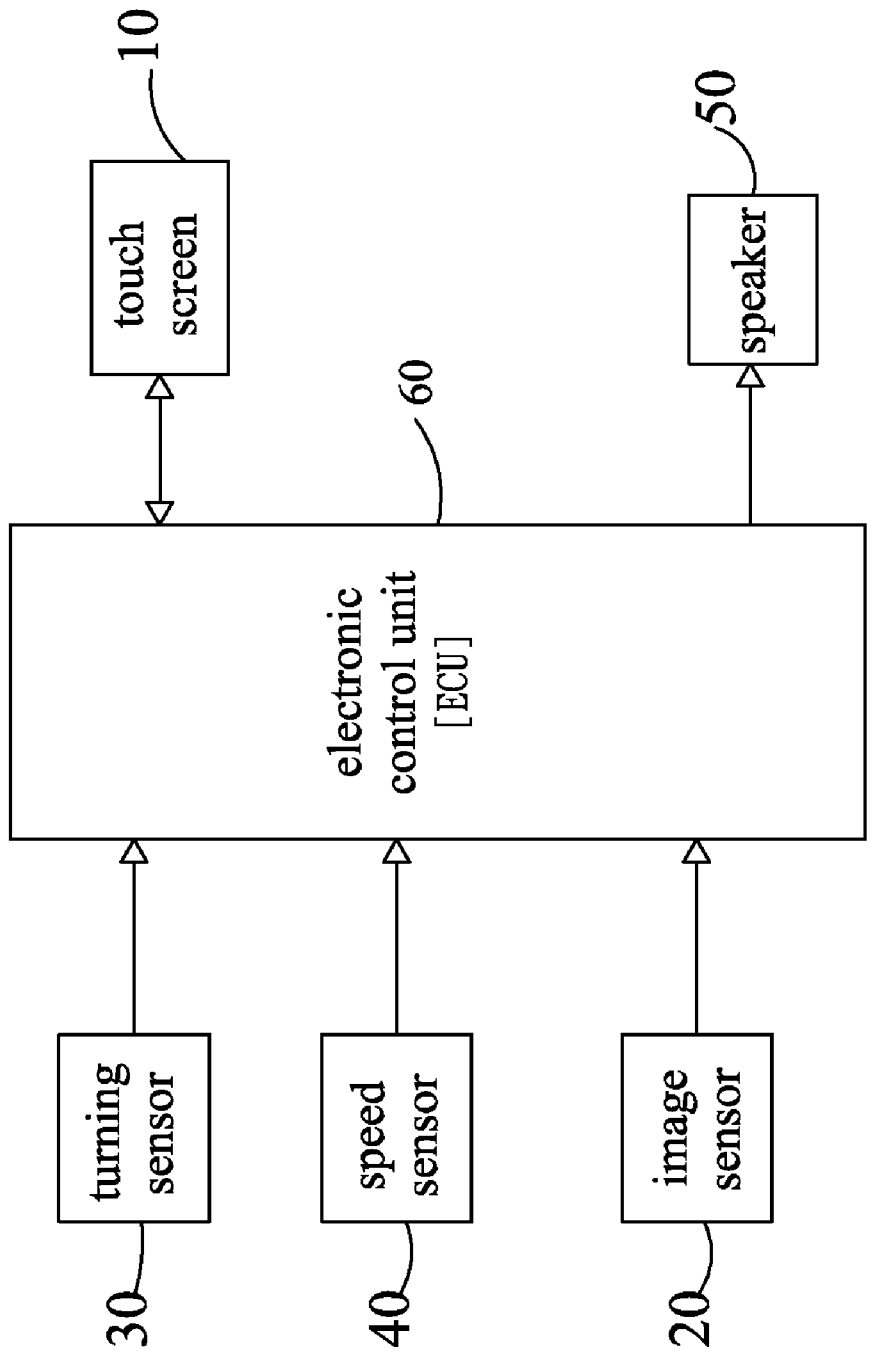
FIG. 1 is a block diagram schematically showing the architecture of a parking pilot system according to one embodiment of the present invention.
Figure 2:
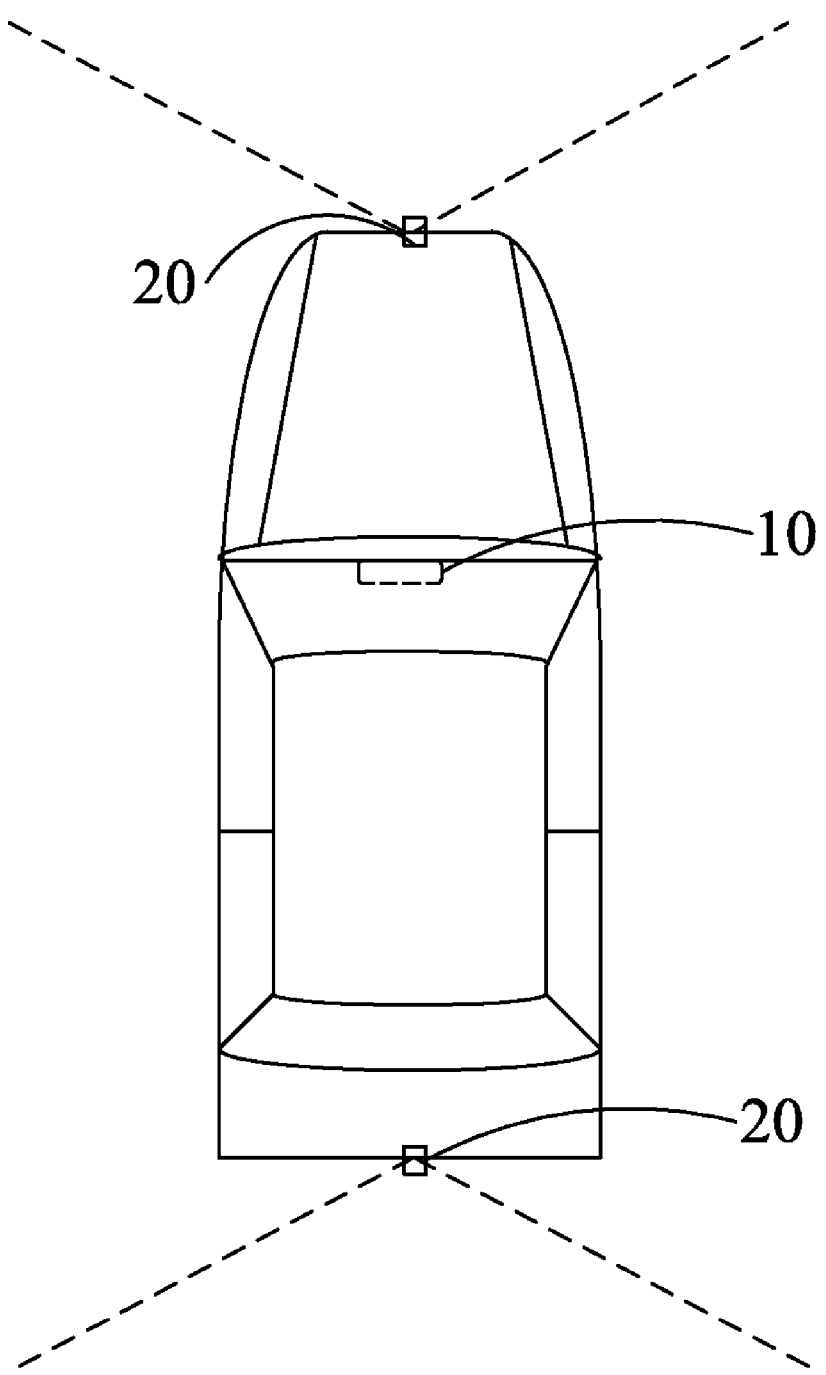
FIG. 2 is a diagram schematically showing the installation positions of the display and the front and rear image sensors of a parking pilot system according to one embodiment of the present invention.

Refer to FIG. 1 for the basic architecture of the parking pilot system of according to one embodiment of the present invention. The parking pilot system of the present invention comprises a display 10, two image sensors 20, a turning sensor 30, a speed sensor 40, a speaker 50, and an ECU 60. Refer to FIG. 2 also. In this embodiment, the display 10 is a touchscreen arranged beside the driver seat and presenting driving information to the driver. The two image sensors 20 are CCD (Charge Coupled Device) or CMOS (Complementary Metal Oxide Semiconductor) devices. The two image sensors 20 are respectively arranged on closely to the front surface and closely to the rear surface of the vehicle body to obtain the images ahead of the front, the front laterals and the rear, the rear laterals of the vehicle respectively. The speed sensor 40 detects the speed of the vehicle. The speed sensor 40 is a wheel-speed sensor or an acceleration sensor. The turning sensor 30 is coupled to the steering mechanism, such as the steering wheel, to detect the turning angle when the vehicle is turning. The speaker 50 makes buzzing to indicate some driving conditions. The display 10, image sensors 20, turning sensor 30, speed sensor 40, and speaker 50 are all electrically coupled to the ECU 60. The ECU 60 collects the data from the abovementioned elements, calculates and analyzes the data, and then presents the results to the driver on the display 10 or alerts the driver with the speaker 50.

Figure 3:
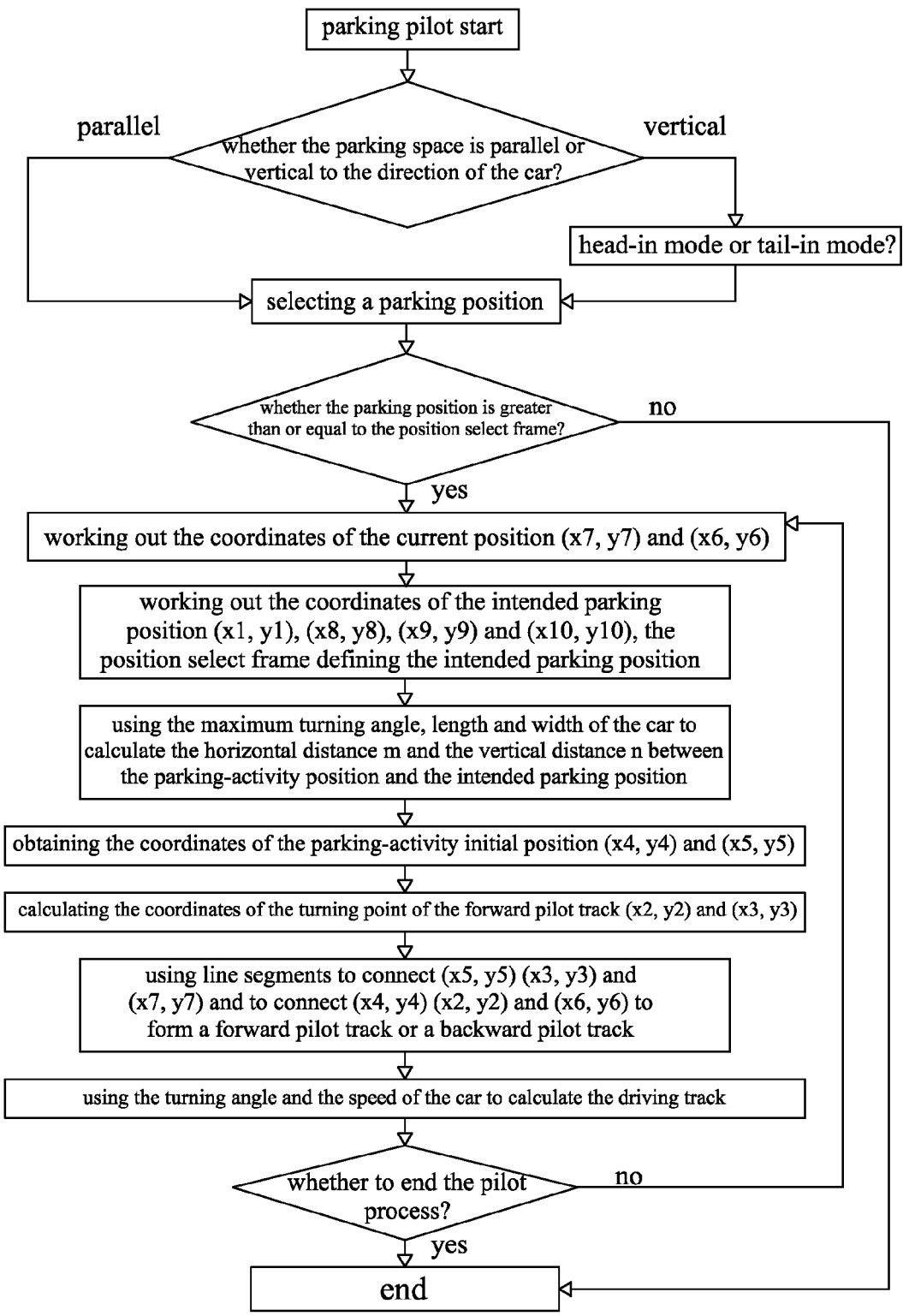
FIG. 3 is a flowchart of a parking pilot method according to one embodiment of the present invention.

Refer to FIG. 3 a flowchart of the parking pilot method of the present invention. Below is described in detail the operation process of the parking pilot method. When the driver intends to find an appropriate intended parking position, the ECU 60 uses a coordinate transformation and a perspective projection algorithm to project the image captured by the image sensor 20 on the display 10. At the same time, the ECU 60 calculates the dimensions of the position select frame according to the size of the vehicle and presents the position select frame on the display 10 also. Next, the ECU 60 checks whether there is an open space large enough to park the car via an image recognition technology. If the answer is yes, the ECU 60 designates the open space as an intended parking position 12 by overlapping the position select frame on the open space. Considering the complexity of a parking activity, the ECU 60 also provides an option to manually select the intended parking position. After switching the system to the manual operation mode, the driver can moves the position select frame on the display 10 to select a parking space. To avoid that the selected parking space cannot accommodate the vehicle, the ECU 60 evaluates from images whether the selected parking space is greater than or equal to the space defined by a position select frame 11. If the answer is yes, the selected parking space is designated to be the intended parking position 12. Thereby, the parking pilot system and method of the present invention can deal with various parking conditions. After the intended parking position 12 is designated, the ECU 60 keeps on presenting the position select frame 11 on the display 10 and makes the position select frame 11 stay in the intended parking position 12. Thereby, the driver can easily park vehicle to an appropriate intended parking position by the position select frame 11 on the display 10 although the park markings of the intended parking position is not clear. Then, the process enters a track-planning stage. If the selected parking space cannot contain the position select frame 11, the ECU 60 proposes the driver to find another available space. After the intended parking position 12 is designated and verified to be greater than or equal to the position select frame 11, the ECU 60 works out an initial parking position 14 according to the current position 13 and the intended parking position 12 and then works out a forward pilot track 15 extending from the current position 13 to the initial parking position 14. The modes that a driver parks his vehicle into the intended parking position 12 include an on-street parking (parallel) mode and a garage-parking mode. The garage-parking mode may be a head-in parking mode or a tail-in parking mode. Before the driver decides a parking mode, the ECU 60 calculates the initial parking positions 14 for various parking modes and then automatically sorts out the parking modes suitable for the intended parking position 12 according to the width of the traffic lane and the dimensions of the intended parking position 12. Then, the ECU 60 proposes the suitable parking modes to the driver with text or symbols on the display 10. According to the built-in setting, the system simultaneously performs coordinate transformation and perspective projection on the images ahead of the front or the front lateral of the vehicle to obtain the coordinates of the current position 13 (x7, y7) and (x6, y6) and the coordinates of the intended parking position 12 (x1, y1), (x8, y8), (x9, y9), and (x10, y10). Then, the system substitutes the coordinates into equations to work out an optimized initial parking position 14 (x4, y4) and (x5, y5). At the same time, the system uses lines to connect the current position 13 (x7, y7) and (x6, y6) with the initial parking position 14 (x4, y4) and (x5, y5) to form a forward pilot track 15; the system also uses lines to connect the initial parking position 14 (x4, y4) and (x5, y5) with the intended parking position 12 (x1, y1) and (x8, y8) to form a backward pilot track 15. Then, the system presents the forward and backward pilot tracks 15 on the display 10. At the same time, the system calculates a driving track 16 of the vehicle according to the turning angles output by the turning sensor 30 and presents the driving track 16 on the display 10. Then, the driver steers the vehicle and makes the driving track 16 follow the pilot track 15. If the driving track 16 deviates from the pilot track 15, the driver amends the direction of the vehicle to correct the driving track 16. Thus, the driver can park the vehicle into the intended parking position easily.

Below are described the equations used in various parking modes. Firstly are introduced the parameters used in the equations. $R_{in}$ represents the minimum inner turning radius, and $R_{out}$ represents the minimum outer turning radius. L represents the length of the vehicle, and W represents the width of the vehicle. b1 represents the allowance of the parking position. $\phi$ represents the turning angle of the steering wheel. $N_s$ represents the ratio of the turning angle of the steering wheel to the turning angle of the wheel of the vehicle. n represents "the vertical distance from the rear wheel of the vehicle in the initial parking position 14 to the intended parking position 12" minus "b1". m represents the horizontal distance from the initial parking position 14 to the intended parking position 12. It should be particularly noted: b1=0 means a minimum usable parking space, and the driver had better closely follow the pilot track 15 and drive slowly less the vehicle collide with other vehicles. When the gears are shifted, the system shifts the images of the image sensor 20 to meet a different driving state. In other words, the system presents different reference pictures according to whether the vehicle is in a forward pilot track or in a backward pilot track. An ultrasonic sensor or an image processing technology is used to detect barriers on the pilot track 15, and the speaker 50 makes alerts for barriers. The initial parking position 14 is calculated with the intended parking position 12 and the minimum turning radius, and the initial parking position 14 is about parallel to the road.

Figure 4:
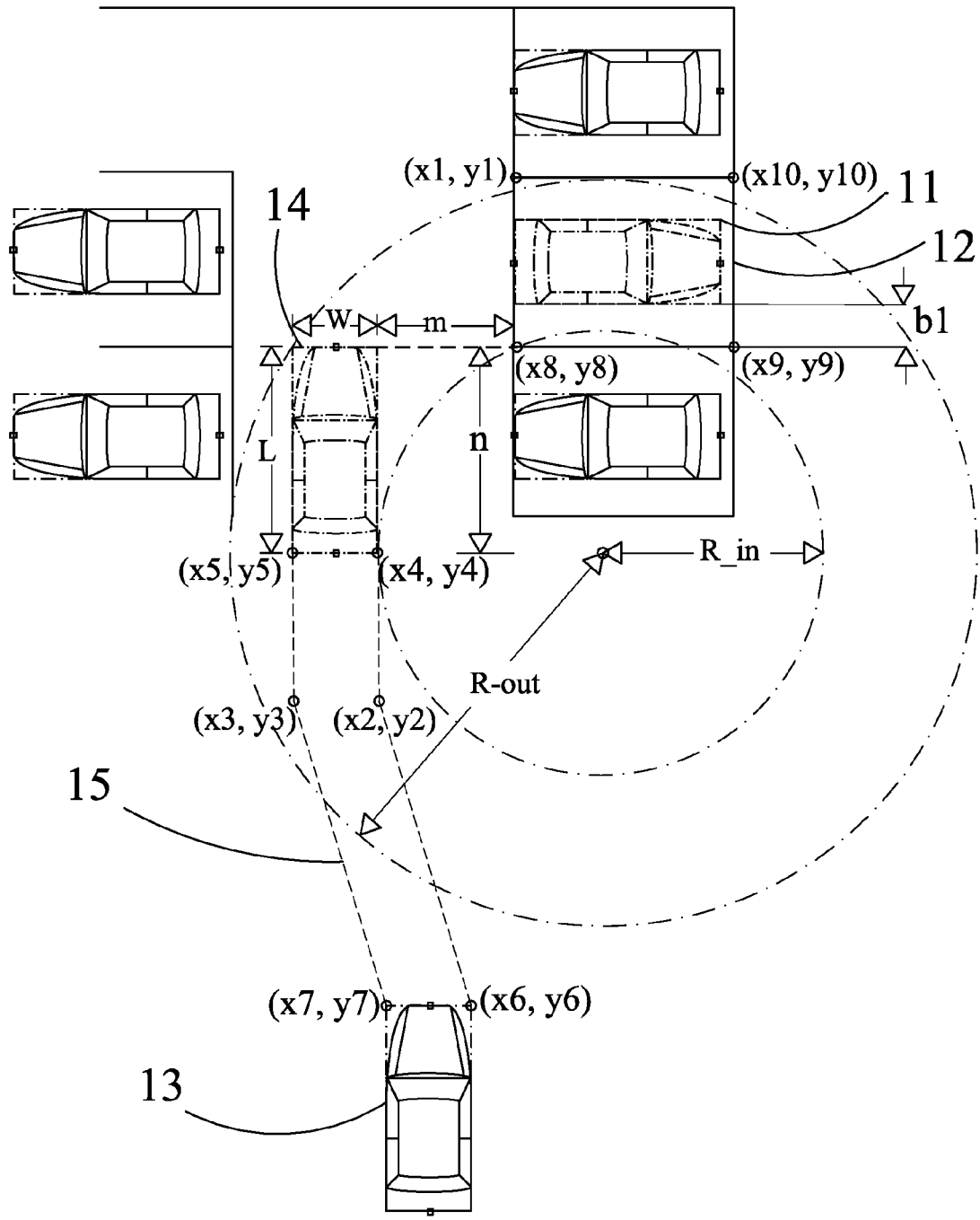
FIG. 4 is a diagram schematically showing a head-in parking mode of a parking pilot method according to one embodiment of the present invention.

Below are respectively described the pilot method for a case that the driving path is parallel to the intended parking position 12 (the parallel parking mode) and the pilot method for a case that the driving path is vertical to the intended parking position 12 (the garage-parking mode). Refer to FIG. 4. Suppose that the intended parking position 12 is about vertical to the driving path, and suppose that the ECU 60 proposes the head-in parking mode to the driver, and suppose that the driver accepts the proposal. The equation to calculate the initial parking position is expressed by $$R_{in} = L \times \cot\left(\frac{\phi_{max}}{N_s}\right) - \frac{W}{2}$$

$$R_{out} = \sqrt{(R_{in} + W)^2 + L^2}$$

$$n = R_{in} - b1$$

$$m \geq m_{min} = R_{in} - \sqrt{R_{in}^2 - n^2}$$

Figure 5:
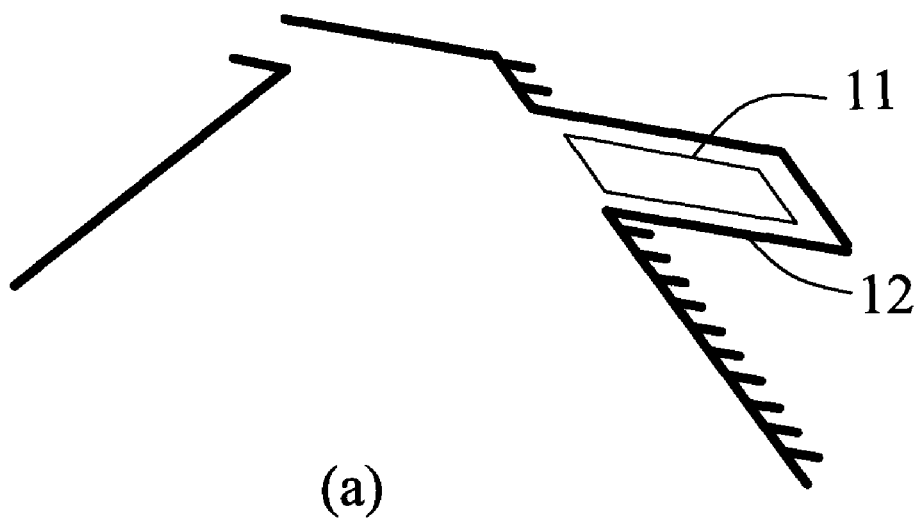
Figure 5:
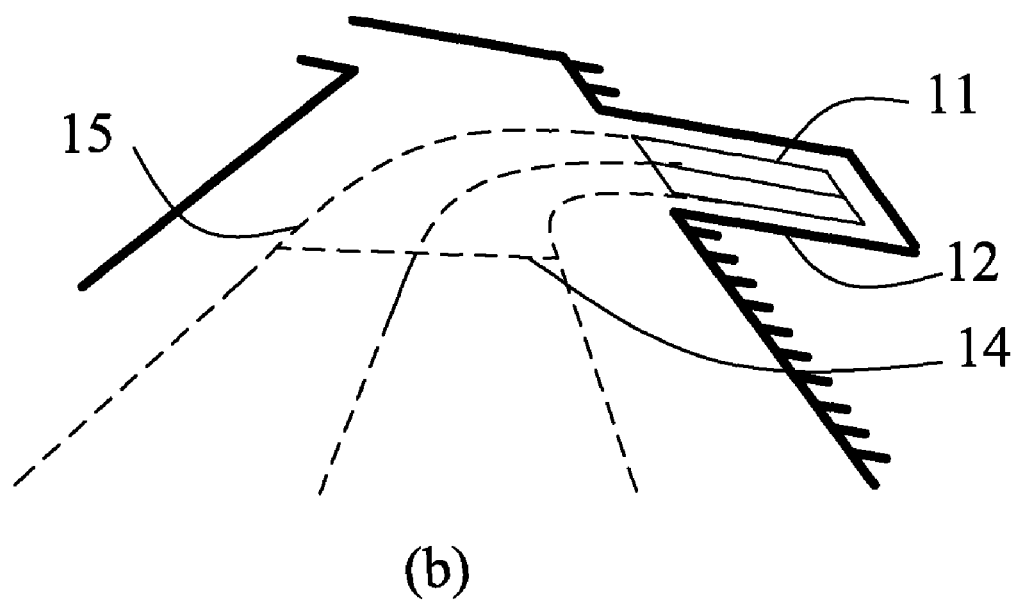
Figure 6:
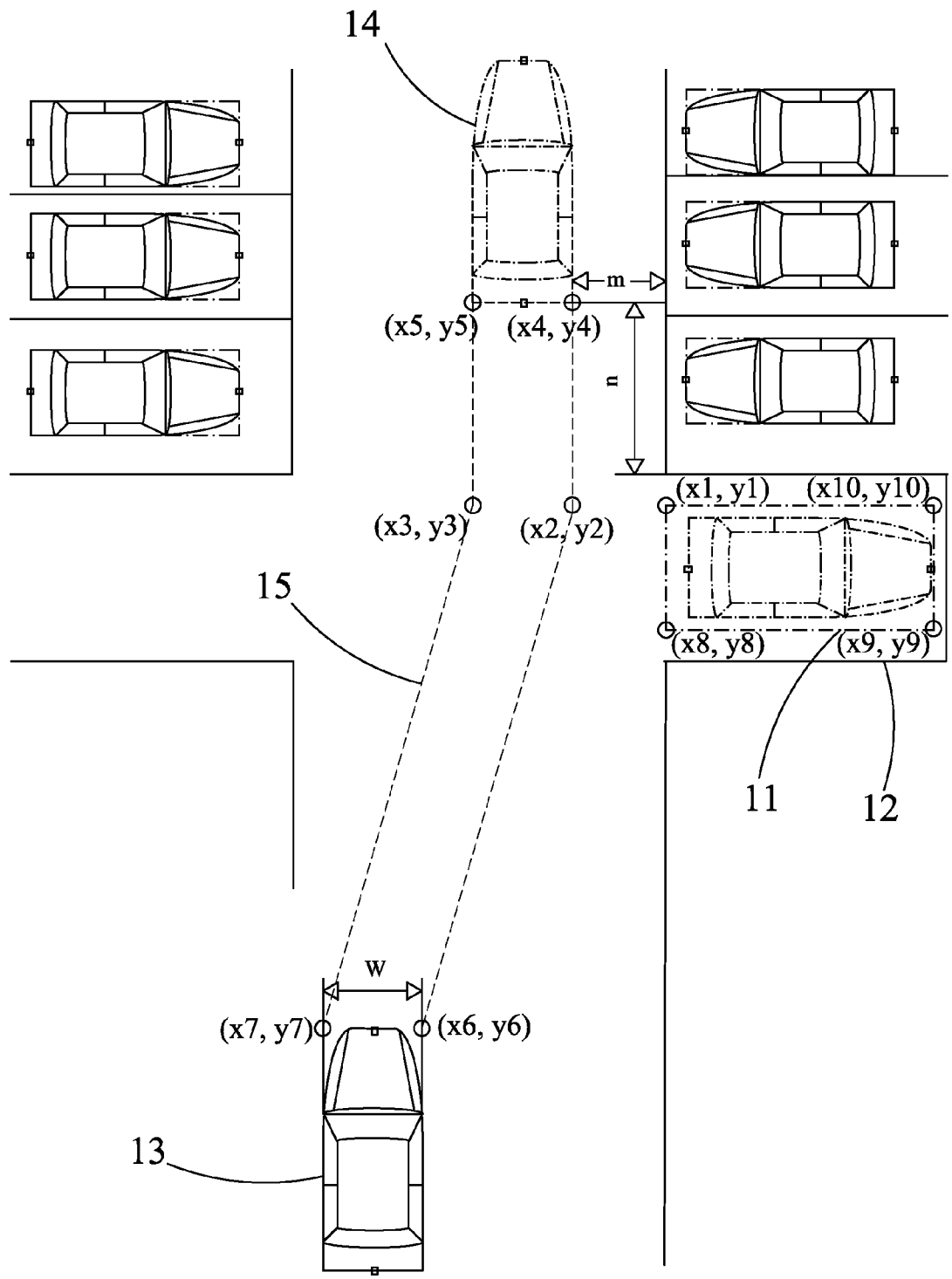
FIG. 6 is a diagram schematically showing another head-in parking mode of a parking pilot method according to one embodiment of the present invention.
Figure 7:
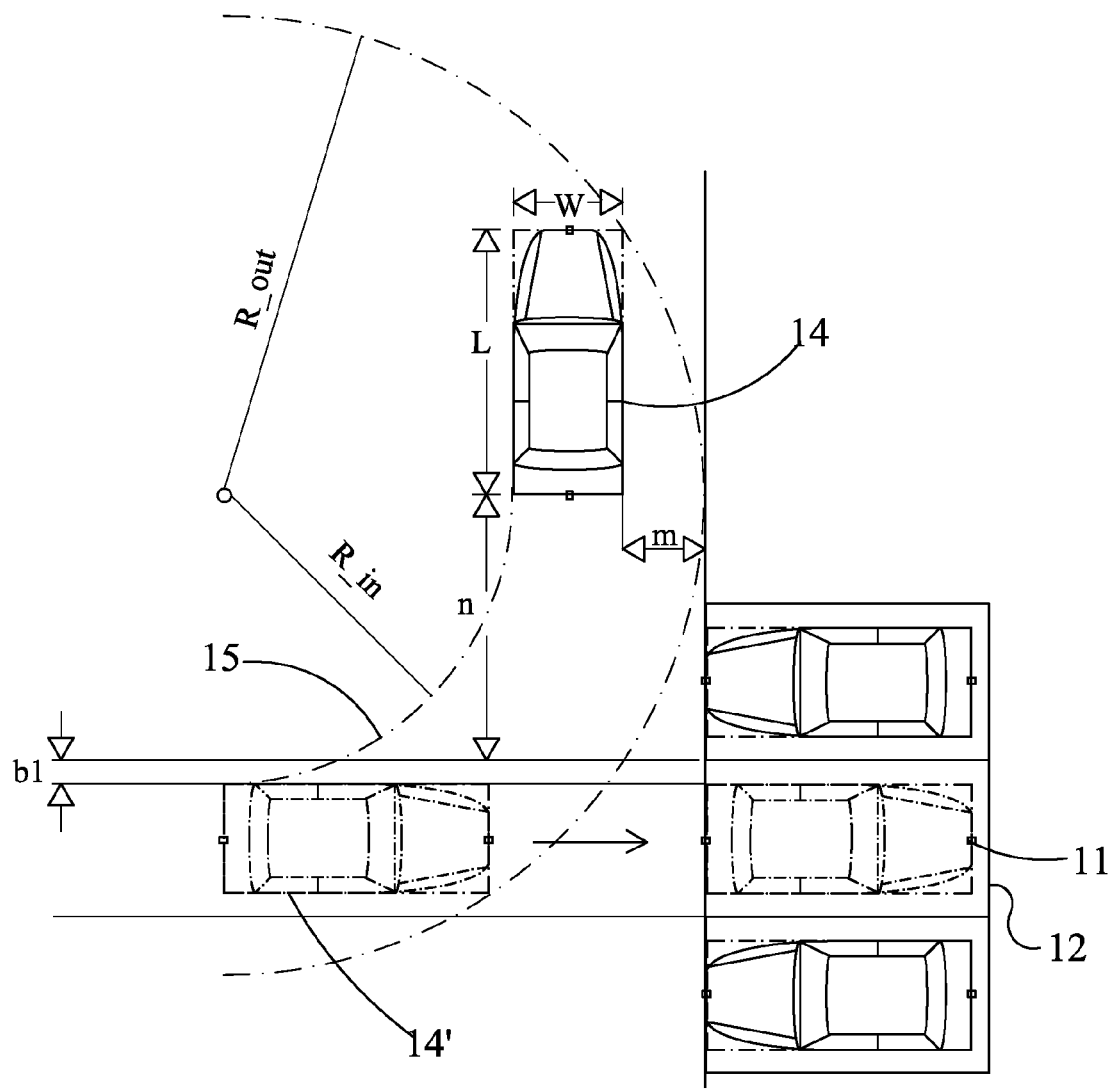
FIG. 7 is a diagram schematically showing the calculation of a turning radius for the head-in parking mode shown in FIG. 6.

Refer to FIG. 5(a) and FIG. 5(b). The system works out an optimized initial parking position 14 with the equation. The driver follows the pilot track 15 and drives the vehicle to the initial parking position 14. Then, the driver rotates the steering wheel to the limit and turns the vehicle directly into the intended parking position 12. Thus, the parking activity is completed by a single operation. Refer to FIG. 6 and FIG. 7. Suppose that the available U-turn space is limited, and suppose that the ECU 60 still presumes that the head-in parking mode is the easiest way to park into the intended parking position 12. The driving path will be that the driver drives the vehicle to an initial parking position 14, and then backs the vehicle to another initial parking position 14' by the minimum turning radius $R_{in}$, wherein the initial parking position 14' is about parallel to the intended parking position 12. Then, the driver drives the vehicle from the initial parking position 14' into the intended parking position 12. The initial parking positions 14 and 14' and the minimum turning radius $R_{in}$ are calculated with the following equations:

$$R_{in} = L \times \cot\left(\frac{\phi_{max}}{N_s}\right) - \frac{W}{2}$$

$$R_{out} = \sqrt{(R_{in} + W)^2 + L^2}$$

$$n = R_{in} - b1$$

$$m \geq m_{min} = R_{out} - R_{in} - W$$

Figure 8:
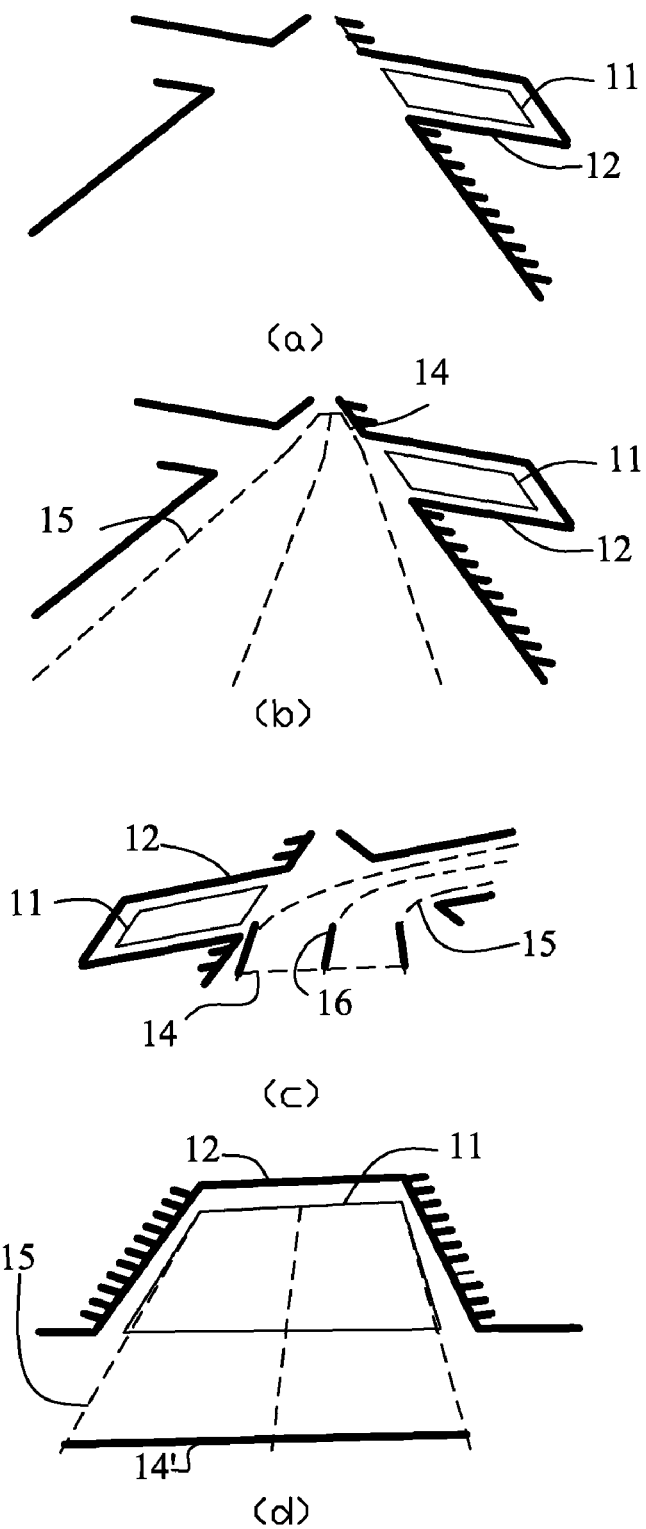

Refer to FIGS. 8(a)-8(d) for the images the system presents on the display 10 in the abovementioned parking mode. FIG. 8(a) shows that the system defines the intended parking position 12 and persistently presents the position select frame 11 on the display 10. FIG. 8(b) shows that the ECU 60 proposes a forward pilot track 15 extending from the current position (not shown in the drawing) to the initial parking position 14. The driver may follow the forward pilot track 15 and drive the vehicle from the current position to the initial parking position 14. FIG. 8(c) shows that the ECU 60 proposes a backward pilot track 15 according to the minimum turning track $R_{in}$ and presents a driving track 16 on the display 10. The driver may back the vehicle by operating the steering wheel to make the driving track 16 match the backward pilot track 15 until the vehicle is about parallel to the intended parking position 12 and another initial parking position 14' appears on the display 10, as shown in FIG. 8(d). Then, the driver may drive the vehicle into the intended parking position 12 directly.

Figure 9:
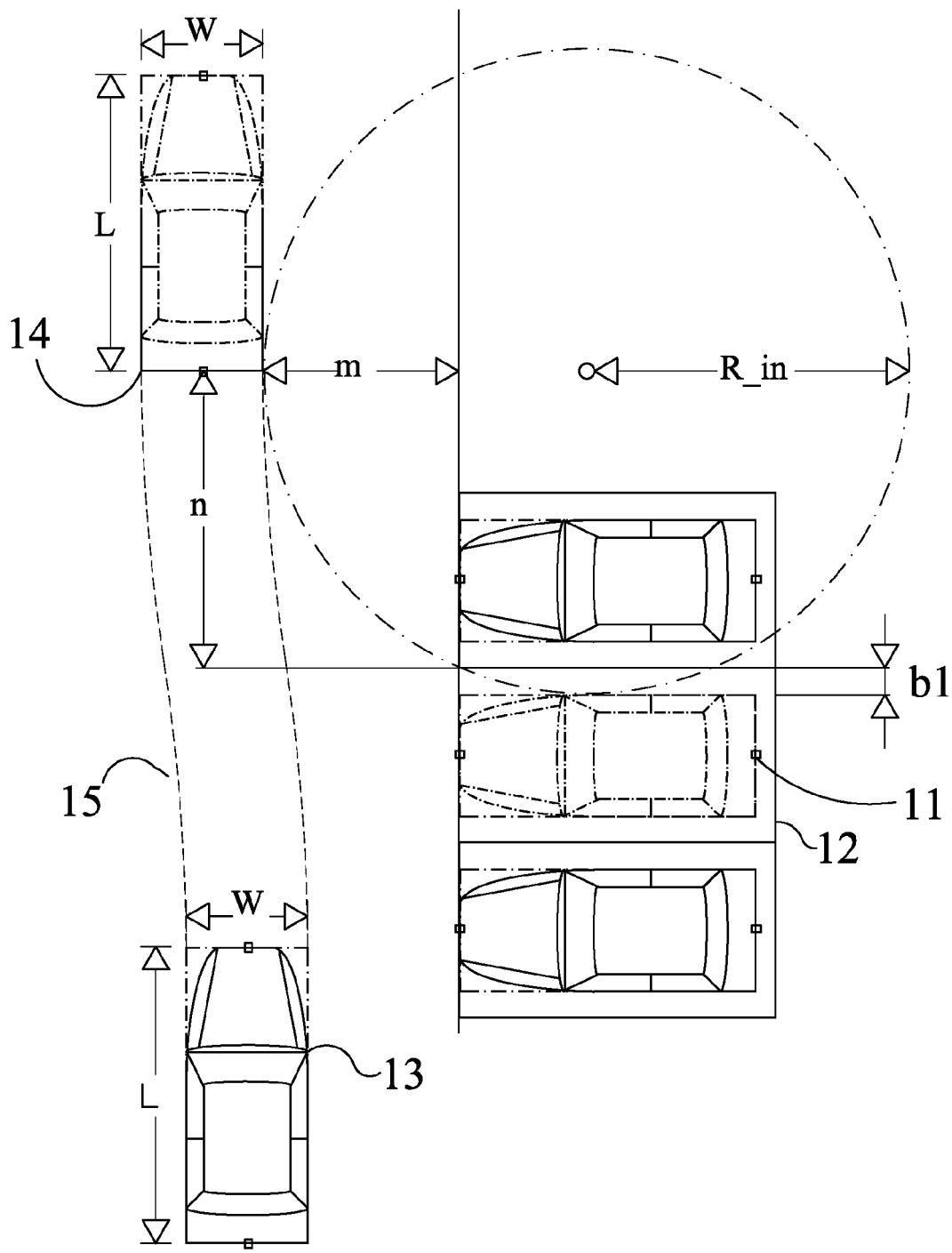
FIG. 9 is a diagram schematically showing a tail-in parking mode of a parking pilot method according to one embodiment of the present invention.

Refer to FIG. 9. If the available U-turn space is sufficient, the driver may directly back the vehicle into the intended parking position 12. The initial parking position 14 of this mode is calculated with the following equations:

$$R_{in} = L \times \cot\left(\frac{\phi_{max}}{N_s}\right) - \frac{W}{2}$$

$$n = R_{in} - b1$$

$$m \geq m_{min} = R_{in} - \sqrt{R_{in}^2 - n^2}$$

Figure 10:
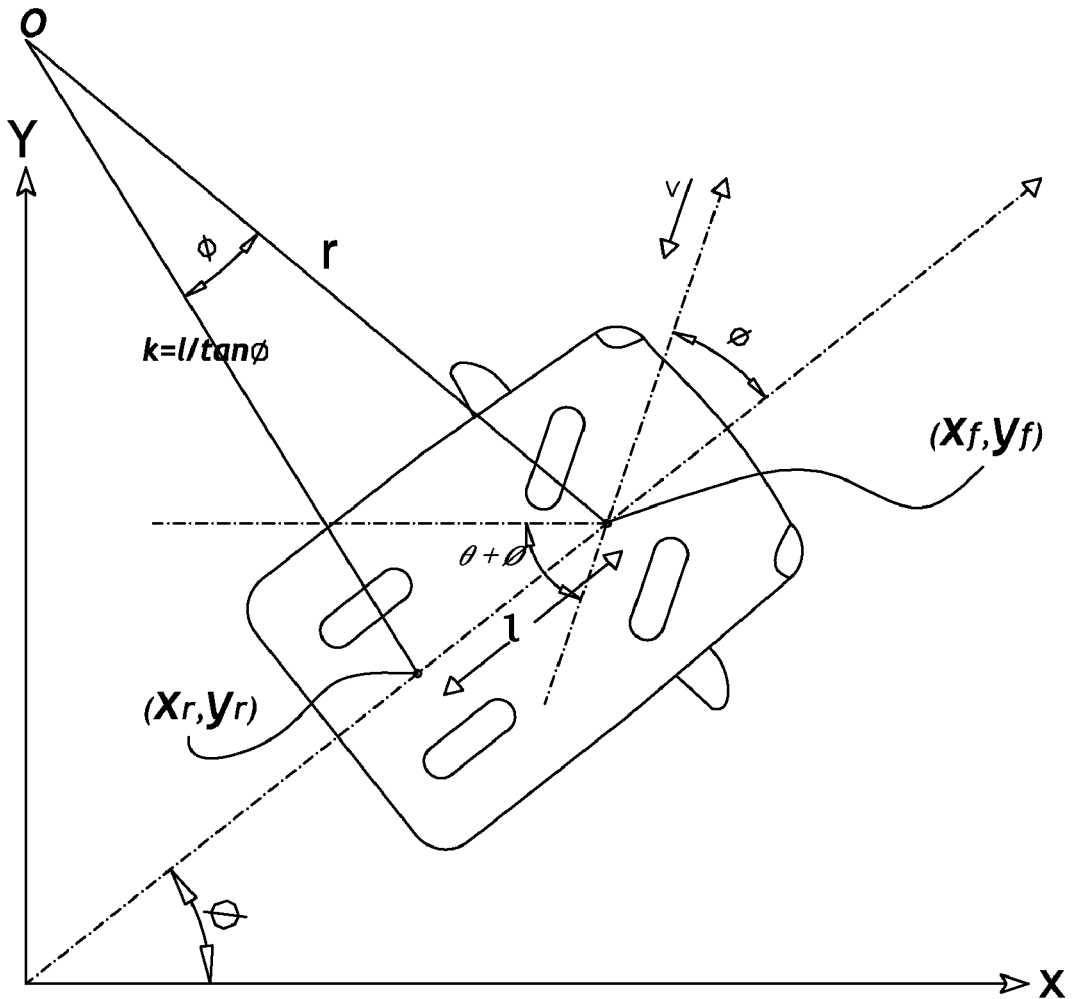
FIG. 10 is a diagram schematically showing a vehicle movement model used to calculate a backward pilot track according to one embodiment of the present invention.

Refer to FIG. 10. Based on the distance and direction of the intended parking position 12, a movement model of the vehicle is constructed with the following equations, and the backward pilot track 10 presented on the display 10 is worked out according to the movement model. In the following equations, v represents velocity, l the distance between the wheel axles, $\phi$ the turning angle with the middle point of the front axle being the vertex, $(x_f, y_f)$ the coordinates of the middle point of the front axle, and $(x_r, x_r)$ the coordinates of the middle point of the rear axle.

The movement track of the left rear corner of the vehicle is calculated with the following equations:

$$x_{rL\_tip}(t) = \left(l \cdot \cot\phi - \frac{W}{2}\right) \cdot \sin\frac{v \cdot \sin\phi}{l} t - d \cdot \cos\frac{v \cdot \sin\phi}{l} t$$

$$y_{rL\_tip}(t) = \left(l \cdot \cot\phi - \frac{W}{2}\right) \cdot \cos\frac{v \cdot \sin\phi}{l} t + l \cdot \cot\phi - d \cdot \sin\frac{v \cdot \sin\phi}{l} t$$

The movement track of the right rear corner of the vehicle is calculated with the following equations:

$$x_{rR\_tip}(t) = \left(l \cdot \cot\phi - \frac{W}{2}\right) \cdot \sin\frac{v \cdot \sin\phi}{l} t - d \cdot \cos\frac{v \cdot \sin\phi}{l} t$$

$$y_{rR\_tip}(t) = \left(l \cdot \cot\phi - \frac{W}{2}\right) \cdot \cos\frac{v \cdot \sin\phi}{l} t + l \cdot \cot\phi - d \cdot \sin\frac{v \cdot \sin\phi}{l} t$$

Figure 11:
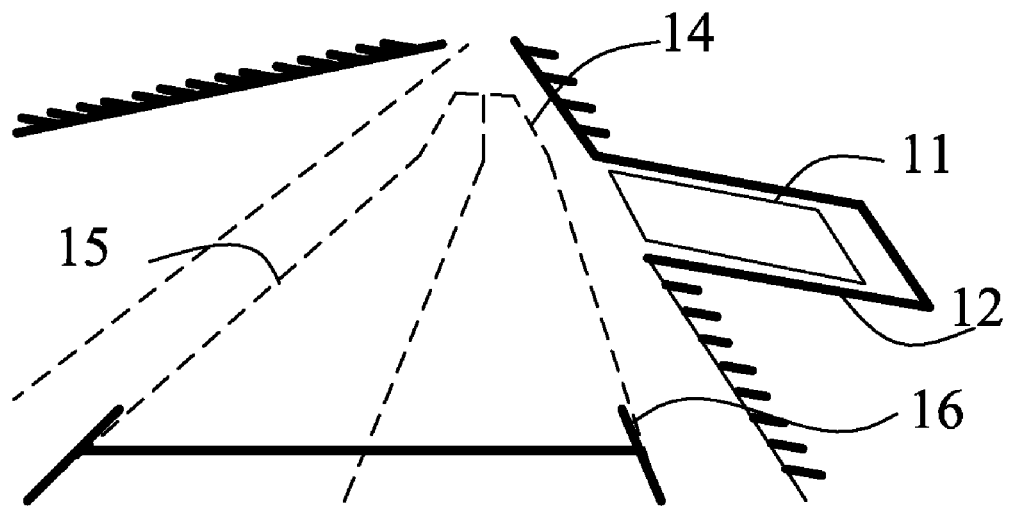
Figure 11:
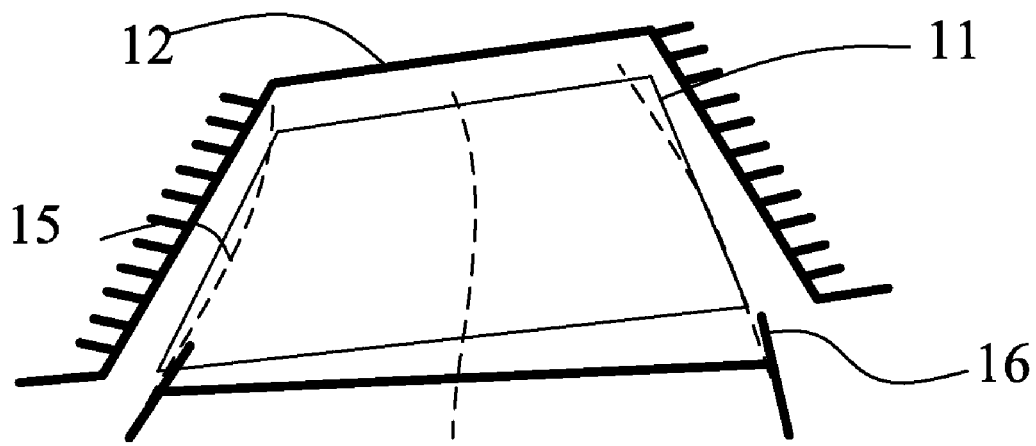
Figure 12:
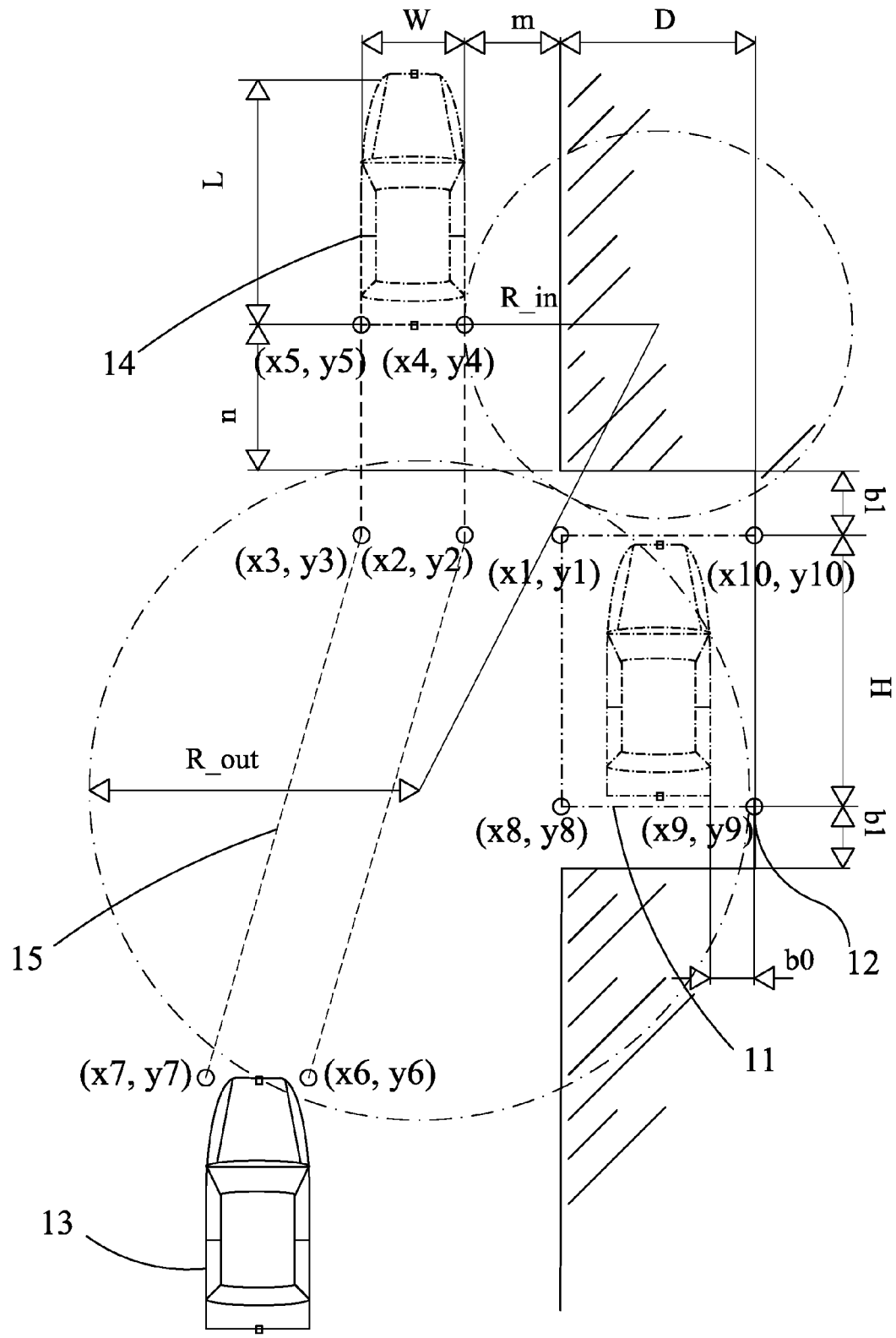
FIG. 12 is a diagram schematically showing an on-street parking mode of a parking pilot method according to one embodiment of the present invention.
Figure 13:
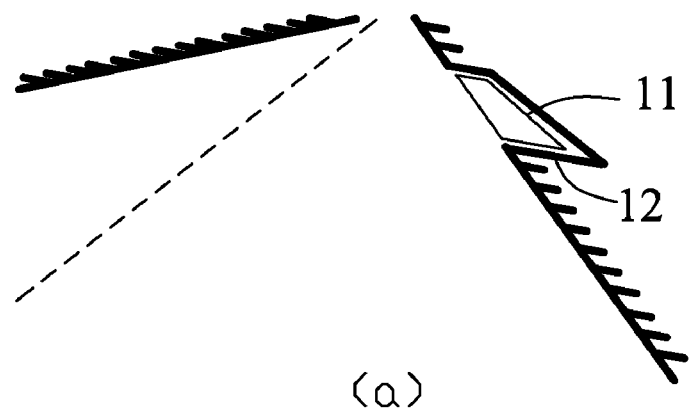
Figure 13:
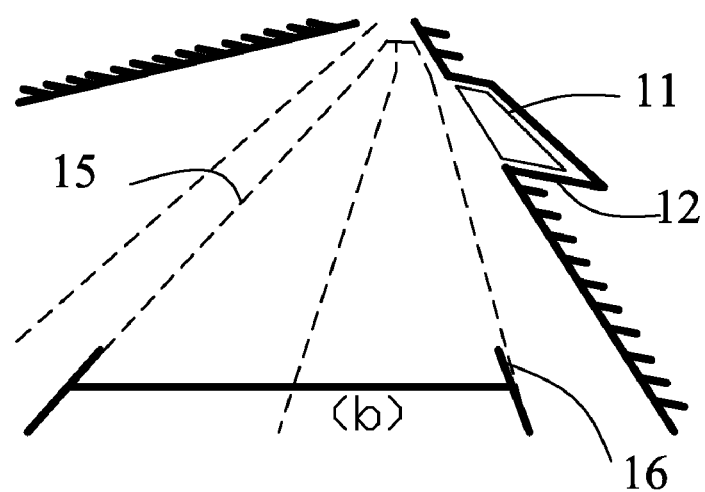
Figure 13:
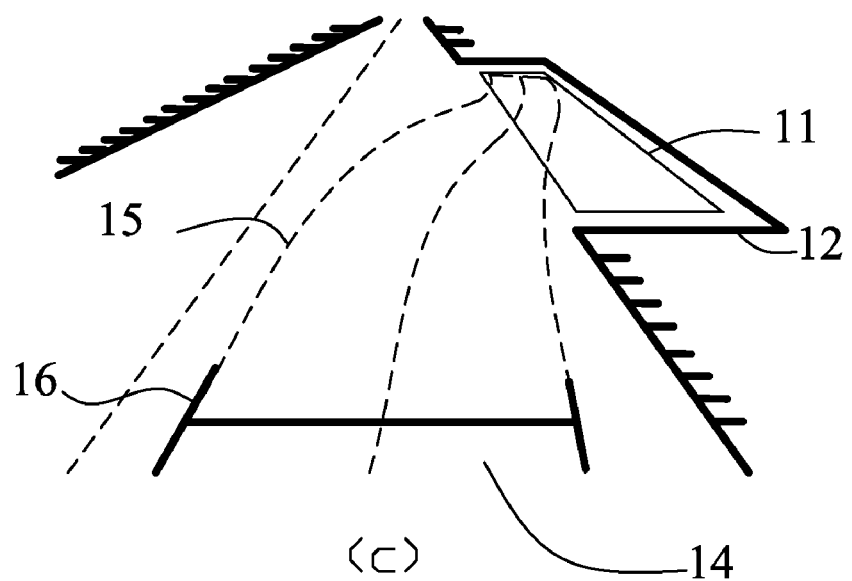

Refer to FIG. 11(a) and FIG. 11(b) for the pictures guiding the driver to back the vehicle into the intended parking position 12 in the garage-parking mode. Refer to FIG. 12. When the driving track is parallel to the intended parking position 12, it means an on-street (parallel) parking mode, and the following equations will be used:

Refer to FIGS. 13(a)-13(c). Herein, the allowance b1, length H and width D of the parking space are also taken into consideration. Thereby, the driver can directly back the vehicle from initial parking position 14 into the intended parking position 12 easily and fast. In a traffic-busy street, rapidly parking into intended parking position 12 perturbs the traffic flow less and prevents from traffic accidents.

In conclusion, the present invention proposes a parking pilot system and method, whereby the driver can park the vehicle fast and easily without spending time on moving the vehicle to-and-fro to find a suitable parking angle. Thus, the driver can save his time. The present invention can guide the driver to the intended parking position; thus, the driver needn't worried about passing by and missing the intended parking bay. The pilot method of the present invention is easy and clear, whereby the probability of colliding with other vehicles or objects is effectively reduced. Therefore, the present invention can overcome the problems of the conventional technologies.

The embodiments described above are to exemplify the present invention to enable the persons skilled in the art to understand, make, and use the present invention. However, it is not intended to limit the scope of the present invention. Therefore, any equivalent modification or variation according to the spirit of the present invention is to be also included within the scope of the present invention.

What is claimed is:

1. A parking pilot system, installed in a vehicle and comprising
a display arranged inside said vehicle and presenting images to a driver;
at least one image sensor arranged in a front portion of said vehicle and capturing images ahead of said vehicle;
at least one speed sensor detecting a speed of said vehicle;
an electronic control unit coupled to said display, said image sensor and said speed sensor, processing images captured by said image sensor to define an intended parking position on said display, working out coordinates of a current position and said intended parking position from images captured by said image sensor and a velocity detected by said speed sensor, calculating an initial parking position, and presenting on said display a forward pilot track extending from said current position through said initial parking position to said intended parking position to park said vehicle directly or presenting on said display a forward pilot track extending from said current position to said initial parking position to guide said driver to drive said vehicle to an optimized initial position for backing said vehicle;
wherein said electronic control unit supports a on-street parking mode and a garage-parking mode; said garage-parking mode is a head-in parking mode; and
wherein when said head-in parking mode is adopted, said electronic control unit uses one set of following equations to calculate said initial parking positions:

$$H = \sqrt{L^2 + 2R_{out}(D - b_0) - (D - b_0)^2}$$

$$\phi_{in} = N_s \times \cot^{-1}\left\{\frac{\sqrt{\left[\frac{(H + n + b_1)^2 - 2R_{out}(m + D - b_0) + (m + D - b_0)^2}{2(m + D - b_0)}\right]^2 - c^2} + \frac{W}{2}}{l}\right\}$$

$$R_{in} = L \times \cot\left(\frac{\phi_{max}}{N_s}\right) - \frac{W}{2}$$

$$R_{out} = \sqrt{(R_{in} + W)^2 + L^2}$$

$$n = R_{in} - b1$$

$$m \geq m_{min} = R_{in} - \sqrt{R_{in}^2 - n^2}$$

$$R_{in} = L \times \cot\left(\frac{\phi_{max}}{N_s}\right) - \frac{W}{2}$$

$$R_{out} = \sqrt{(R_{in} + W)^2 + L^2}$$

$$n = R_{in} - b1$$

$$m \geq m_{min} = R_{out} - R_{in} - W$$

wherein $R_{in}$ represents a minimum inner turning radius, and $R_{out}$ represents a minimum outer turning radius; L represents a length of said vehicle, and W represents a width of said vehicle; b1 represents an allowance of a parking space; φ represents a turning angle of a steering wheel; $N_s$ represents a ratio of said turning angle of said steering wheel to a turning angle of a wheel of said vehicle; n represents "a vertical distance from rear wheels of said vehicle in said initial parking position to said intended parking position" minus "said b1"; m represents a horizontal distance from said initial parking position to said intended parking position.

2. The parking pilot system according to claim 1 further comprising an image sensor arranged in a rear portion of said vehicle and capturing images behind said vehicle, wherein when said vehicle has been at said initial parking position and reverse parking, said electronic control unit calculates a backward pilot track extending from said initial parking position to said intended parking position and presents said backward pilot track on said display.

3. The parking pilot system according to claim 1, wherein a position select frame is used to define said intended parking position; after having defined said intended parking position, said position select frame remains on said display and stays in said intended parking position.

4. The parking pilot system according to claim 3, wherein when defining said intended parking position, said electronic control unit checks via images whether a parking space of said position select frame is greater than or equal to said position select frame; if said parking space is greater than or equal to said position select frame, said parking space is designated to be said intended parking position.

5. The parking pilot system according to claim 4, wherein when defining said parking space which is greater than or equal to said position select frame designated to be said intend parking position by said electronic control unit automatically.

6. The parking pilot system according to claim 1, wherein said electronic control unit calculates said initial parking positions for various parking modes and then automatically sorts out parking modes that enables said vehicle to park in said intended parking position according to a width of a traffic lane and a width of said intended parking position.

7. The parking pilot system according to claim 1 further comprising a turning sensor providing a turning angle for said electronic control unit, wherein said electronic control unit uses said turning angle to calculate a driving track, and makes said driver operates a steering wheel to drive said vehicle and make said driving track match said pilot track when parking.

8. The parking pilot system according to claim 1 further comprising at least one ultrasonic sensor coupled to said electronic control unit and detecting barriers around said vehicle.

9. The parking pilot system according to claim 1, wherein said electronic control unit calculates said initial parking position according to a minimum turning radius of said vehicle.

10. The parking pilot system according to claim 1, wherein said initial parking position is about parallel to a road.

11. A parking pilot method by the parking pilot system, used to pilot a vehicle and comprising step (A) capturing images ahead of said vehicle and detecting a speed of said vehicle by a image sensor and a speed sensor, respectively;

step (B) processing by the image sensor and analyzing said images to define an intended parking position on a display;

step (C) obtaining coordinates of a current position and said intended parking position by an electronic control unit, working out an initial parking position by the electronic control unit, and presenting of the initial parking position on said display a forward pilot track extending from said current position through said initial parking position to said intended parking position to guide a driver to park said vehicle directly or presenting on said display a forward pilot track extending from said current position to said initial parking position to guide said driver to drive said vehicle to an optimized initial parking position for parking said vehicle;

wherein an on-street parking mode or a garage-parking mode is used in said step (C); said garage-parking mode is a head-in parking mode; and wherein when said head-in parking mode is adopted by the electronic control unit, one set of following equations is used to calculate said initial parking positions:

$$R_{in} = L \times \cot\left(\frac{\phi_{max}}{N_s}\right) - \frac{W}{2}$$

$$R_{out} = \sqrt{(R_{in} + W)^2 + L^2}$$

$$n = R_{in} - b1$$

$$m \geq m_{min} = R_{in} - \sqrt{R_{in}^2 - n^2}$$

$$R_{in} = L \times \cot\left(\frac{\phi_{max}}{N_s}\right) - \frac{W}{2}$$

$$R_{out} = \sqrt{(R_{in} + W)^2 + L^2}$$

$$n = R_{in} - b1$$

$$m \geq m_{min} = R_{out} - R_{in} - W$$

wherein $R_{in}$ represents a minimum inner turning radius, and $R_{out}$ represents a minimum outer turning radius; L represents a length of said vehicle, and W represents a width of said vehicle; b1 represents an allowance of a parking space; φ represents a turning angle of a steering wheel; $N_s$ represents a ratio of said turning angle of said steering wheel to a turning angle of a wheel of said vehicle; n represents "a vertical distance from rear wheels of said vehicle in said initial parking position to said intended parking position" minus "said b1"; m represents a horizontal distance from said initial parking position to said intended parking position.

12. The parking pilot method according to claim 11, wherein when said vehicle reaches said initial parking position in said step (C), images behind said vehicle are captured by the image sensor, and a backward pilot track extending from said initial parking position to said intended parking position is presented on said display.

13. The parking pilot method according to claim 11, wherein a position select frame is used to define said intended parking position in said step (B); after having defined said intended parking position, said position select frame remains on said display and stays in said intended parking position.

14. The parking pilot method according to claim 13, wherein when said position select frame is used to define said intended parking position, images are used by the electronic control unit in checking whether a parking space of said position select frame is greater than or equal to said position select frame; if said parking space is greater than or equal to said position select frame, said parking space is designated to be said intended parking space.

15. The parking pilot method according to claim 14, wherein when said position select frame is used to define said intended parking position in said step (B), images are used by the electronic control unit in automatically examining whether an open space is greater than or equal to said position select frame; if said open space is greater than or equal to said position select frame, said open space is designated to be said intended parking space.

16. The parking pilot method according to claim 11, wherein said initial parking positions for various parking mode are calculated by the electronic control unit firstly; and then parking modes that enables said vehicle to park in said intended parking position are sorted out for a user according to a width of a traffic lane and a width of said intended parking position.

17. The parking pilot method according to claim 11, wherein in said step (C), a turning angle of said vehicle is obtained to calculate a driving track, and said driver operates a steering wheel to drive said vehicle and to make said driving track match said pilot track when parking.

18. The parking pilot method according to claim 11, wherein in said step (C), at least one ultrasonic sensor is used to detect barriers around said vehicle.

19. The parking pilot method according to claim 11, wherein in said step (C), a minimum turning radius of said vehicle is used by the electronic control unit to calculate said initial parking position.

20. The parking pilot method according to claim 11, wherein in said step (C), said initial parking position is about parallel to a road.

\* \* \* \* \*